US012763107B2

(12) United States Patent
Fayan et al.

(10) Patent No.: US 12,763,107 B2
(45) Date of Patent: Oct. 13, 2026

(54) ARTIFICIAL INTELLIGENCE AND MACHINE LEARNING FOR TRANSCRIPTION AND TRANSLATION FOR MEDIA EDITING

(71) Applicant: Avid Technology, Inc., Burlington, MA (US)

(72) Inventors: Randy Fayan, Arlington, MA (US); Robert Gonsalves, Wellesley, MA (US)

(73) Assignee: AVID TECHNOLOGY, INC., Burlington, MA (US)

( * ) Notice: Subject to any disclaimer, the term of this patent is extended or adjusted under 35 U.S.C. 154(b) by 229 days.

(21) Appl. No.: 18/764,276

(22) Filed: Jul. 4, 2024

(65) Prior Publication Data

US 2025/0292799 A1 Sep. 18, 2025

Related U.S. Application Data

(60) Provisional application No. 63/565,041, filed on Mar. 14, 2024.

(51) Int. Cl.
*G11B 27/031* (2006.01)
*G06F 40/58* (2020.01)
(Continued)

(52) U.S. Cl.
CPC ............ *G11B 27/031* (2013.01); *G06F 40/58* (2020.01); *G10L 13/02* (2013.01); *G10L 15/26* (2013.01)

(58) Field of Classification Search
CPC ....... G11B 27/031; G06F 40/58; G10L 13/02; G10L 15/26; G10L 13/00
See application file for complete search history.

(56) References Cited

U.S. PATENT DOCUMENTS

| | | | | |
|---|---|---|---|---|
| 2003/0164845 | A1* | 9/2003 | Fayan | G11B 27/034 348/E5.051 |
| 2022/0377407 | A1* | 11/2022 | Marchuk | H04N 21/8547 |
| 2025/0118336 | A1* | 4/2025 | Di Gangi | G10L 13/10 |

OTHER PUBLICATIONS

Chronopoulou et al. "Jointly Optimizing Translations and Speech Timing to Improve Isochrony in Automatic Dubbing" AWS AI Labs, Center for Information and Language Processing arXiv:2302.12979v1 [cs.CL] Feb. 25, 2023 (Year: 2023).*

(Continued)

*Primary Examiner* — Daniel C Washburn
*Assistant Examiner* — Penny L Caudle
(74) *Attorney, Agent, or Firm* — Oliver Strimpel

(57) ABSTRACT

Dialog in a language unfamiliar to an editor poses obvious challenges during the media editing process. It is nearly impossible to edit media containing spoken dialog without a clear comprehension of the underlying language. The methods described here use a combination of artificial intelligence and machine learning models to generate a language proxy in which the dialog is translated into a language that is familiar to the media editor. The editor is then able to edit the media composition in their own language. To generate an edited media composition with spoken dialog in the original language, the edited language proxy is synchronized with and linked back to the original media. The methods combine automatic speech recognition, translation, speech to text, and voice cloning together with existing non-AI technologies such as captioning and media relinking.

12 Claims, 4 Drawing Sheets

(51) Int. Cl.
*G10L 13/02* (2013.01)
*G10L 15/26* (2006.01)

(56) References Cited

OTHER PUBLICATIONS

Arik, S., et al., "Neural Voice Cloning with a Few Samples," Advances in Neural Information Processing Systems, NeurIPS, 2018.
Azure Text to Speech Service, https://learn.microsoft.com/en-us/azure/ai-services/speech-service/releasenotes?tabs=text-to-speech, Aug. 2020.
Bahdnau, D., "Neural Machine Translation by Jointly Learning to Align and Translate," arXiv:1409.0473, May 19, 2016.
Burk, P., et al., Music and Computers: A Theoretical and Historical Approach: Chapter 4, Section 4.4 https://musicandcomputersbook.com/, 2011.
Dabre, R., et al., "A Survey of Multilingual Neural Machine Translation," ACM Computing Surveys, vol. 53, Iss. 5, Art. No. 99, Sep. 2020.
Luong, H.T., et al., "Nautilus: A Versatile Voice Cloning System," arXiv:2005.11004, 2020.
Media Composer Editing Guide, pp. 377-385, Dec. 22, 2022.
Neekhara, P., et al., "Expressive Neural Voice Cloning," arXiv:2102.00151, 2021.
Popel, M., et al., "Transforming Machine Translation: A Deep Learning System Reaches News Translation Quality Comparable to Human Professionals," Nature Communications, vol. 11, No. 1, Springer Nature, 2020.
Pratap, V., et al., "Scaling speech technology to 1,000+ languages," arXiv:2305.13516v1, May 22, 2023.
Radford, E., et al., "Robust Speech Recognition via Large-Scale Weak Supervision," Proceedings of the 40th International Conference on Machine Learning, 2023.
Rubin, P., et al., "An articulatory synthesizer for perceptual research," Journal of the Acoustical Society of America, vol. 70 pp. 321-328, 1978.
Vaswani, A., et al. "Attention is All You Need," Advances in Neural Information Processing Systems, NIPS, arXiv:1706.03762, 2017.
Zhang, Y., et al., "Google USM: Scaling automatic speech recognition Beyond 100 Languages," arXiv:2303.01037, Sep. 25, 2023.

* cited by examiner

ARTIFICIAL INTELLIGENCE AND MACHINE LEARNING FOR TRANSCRIPTION AND TRANSLATION FOR MEDIA EDITING

BACKGROUND

Editing media in an unfamiliar language is nearly impossible as a thorough comprehension of the dialogue is required to produce a coherent product. To the extent this can be done at all with existing methods, a transcript of the original dialog is generated using speech-to-text techniques, and the transcript text can be translated into the native language of the editor. Timing information associated with the transcript can then be used to display the translated version of a dialog transcript of dialog as subtitles. However, this requires the editor to read translations which are composited onto the video, and which therefore can distract the editor from the picture. There is a need for a solution to the problem of editing media that is in a language unfamiliar to the editor that does not rely on the display of subtitles.

SUMMARY

In general, a language proxy, which is a version of the original media in a translated language, is created through a combination of AI/ML models. In certain use cases, the translated language is a language familiar to a media editor. When used with media relinking options, the use of the language poxy enables the editor to edit media and create a coherent final product that is in a language unfamiliar to the editor.

In general, in a first aspect, a method of editing a media composition comprises: receiving a media composition that includes dialog in a first language spoken by a first voice; converting the spoken dialog in the first language to first language text using automatic speech recognition; using machine-learning-based text-to-text translation to translate the first language text into second language text; using text-to-speech synthesis on the second language text to generate a spoken dialog in the second language; generating a language proxy by linking the spoken dialog in the second language to the media composition, such that the spoken dialog in the second language is in temporal synchrony with video of the media composition; and enabling an editor to edit the media composition by editing the language proxy.

Various embodiments include one or more of the following features. The text-to-speech synthesis on the second language text uses machine-learning-based voice cloning to generate dialog in the second language spoken by a voice that resembles the first voice. Relinking a version of the media composition that has been edited using the language proxy to source media of the media composition, wherein the source media includes the spoken dialog in the first language; and generating an edited version of the media composition with dialog spoken in the first language. The spoken dialog in the second language is stored as a file and the language proxy retrieves audio from the file. The spoken dialog in the second language is generated in real-time when required by an editor who is editing the media composition with dialog in the second language. Compositing over the video of the media composition a text translation in the second language of the spoken dialog in the first language. Compositing over the video of the media composition text of the spoken dialog in the first language. The spoken dialog in the second language is temporally synchronized by matching a plurality of sentence durations in spoken dialog in the second language to corresponding sentence durations in the dialog spoken in the first language. The media composition includes video that is synchronized with the spoken dialog in the first language. The spoken dialog in the second language is time-stretched to improve synchronization of the spoken dialog in the second language with the video. The video is retimed to synchronize with the spoken dialog in the second language and the media composition is finished with spoken dialog in the second language.

In general, in a another aspect, a computer program product comprises: a non-transitory computer-readable medium with computer-readable instructions encoded thereon, wherein the computer-readable instructions, when processed by a processing device instruct the processing device to perform a method of editing media, the method comprising: converting the spoken dialog in the first language to first language text using automatic speech recognition; using machine-learning-based text-to-text translation to translate the first language text into second language text; using text-to-speech synthesis on the second language text to generate a spoken dialog in the second language; generating a language proxy by linking the spoken dialog in the second language to the media composition, such that the spoken dialog in the second language is in temporal synchrony with video of the media composition; and enabling an editor to edit the media composition by editing the language proxy.

In general, in a further aspect, a system comprises: a memory for storing computer-readable instructions; and a processor connected to the memory, wherein the processor, when executing the computer-readable instructions, causes the system to perform a method of editing media, the method comprising: converting the spoken dialog in the first language to first language text using automatic speech recognition; using machine-learning-based text-to-text translation to translate the first language text into second language text; using text-to-speech synthesis on the second language text to generate a spoken dialog in the second language; generating a language proxy by linking the spoken dialog in the second language to the media composition, such that the spoken dialog in the second language is in temporal synchrony with video of the media composition; and enabling an editor to edit the media composition by editing the language proxy.

DETAILED DESCRIPTION

We describe herein the generation and use of a new version of audio or video media that contains dialog. In the new version, the dialog is spoken in a second language that is different from the language of the original media. This new version, which is referred to herein as a language proxy, is designed to facilitate the editing of media by an editor who is familiar with the second language but not familiar with the language spoken in the dialog of the original. The term proxy is used, as in other media editing contexts, to indicate a version of the media that is of sufficient quality to permit an editor to play and edit the media during the editing process but is not usually of sufficient quality for the final product. An example of a video format used for proxy purposes is Avid DNxHR™. The language proxy may exist as one or more new files on local or remote storage, or it may be created on-the-fly in memory as the media is played back.

As with existing proxy workflows, the final edited version is generated from the language proxy by relinking of the edited sequence back to the original media assets. More specifically, the media being edited includes a sequence of clips or segments that are arranged in a specific order. When the sequence is completed and subject to final review, the language proxy clips in the editor's native language are relinked back to the original version in the initial language. In certain use cases, the version in the translated language is relinked to the underlying video clips, if present, and rendered as a final product in the translated language. No relinking is necessary for audio-only compositions when the edited version in the translated language is used as the deliverable.

Figure 1:
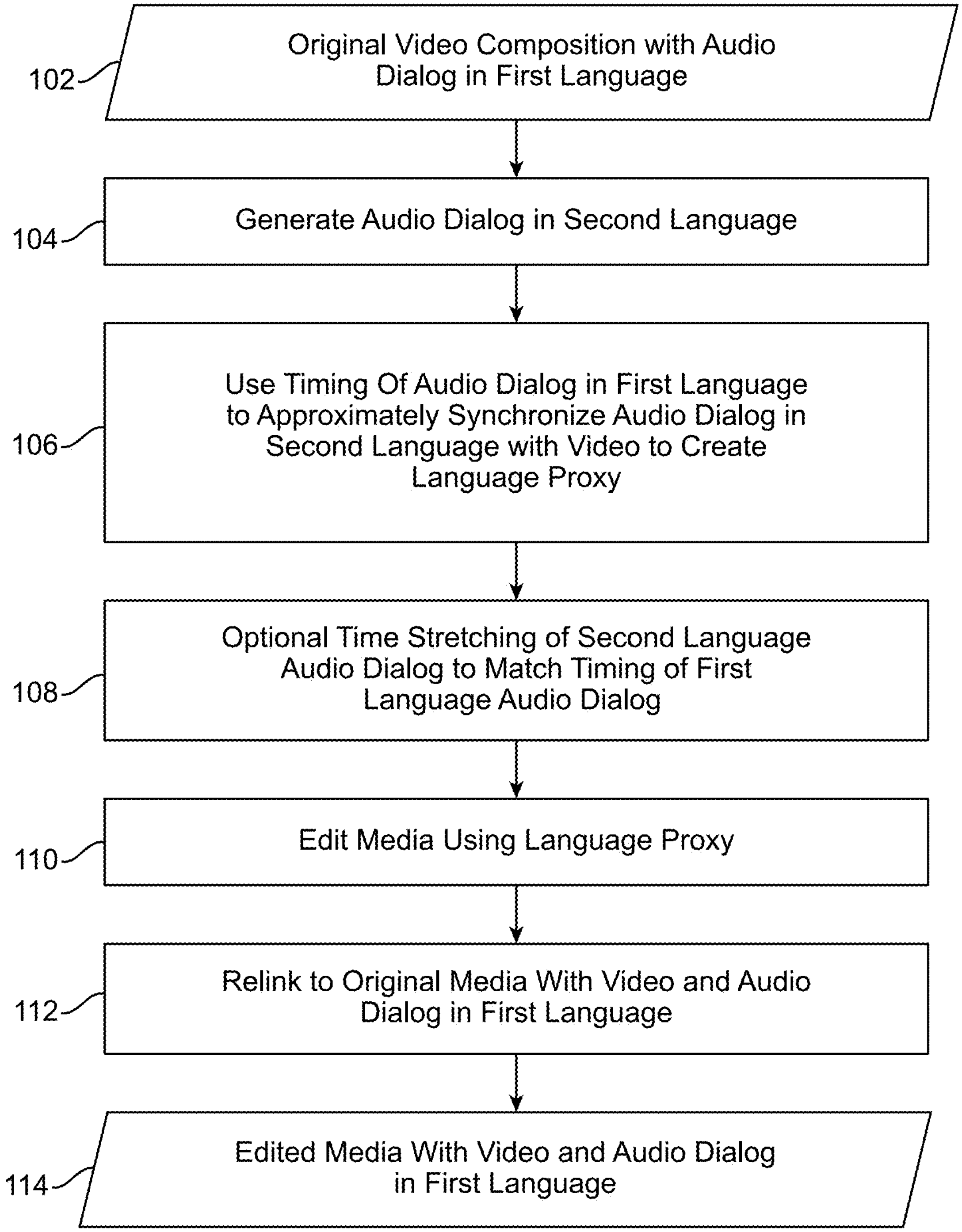
FIG. 1 is a high-level process flow diagram illustrating the steps involved in editing of a video composition with audio dialog using a language proxy.

FIG. 1 is a high-level flow diagram showing the main steps involved in editing a media composition that includes video and one or more synchronized audio tracks containing spoken dialog. Original media 102 includes one or more audio tracks that contain spoken dialog in a first language. This is used as the source material for generating the audio dialog in a second language (step 104), as described below. The audio dialog in the second language is then synchronized with the video in the original composition using timing information associated with a transcript of the original dialog to create the language proxy (step 106). The synchronization may be approximate, at least at certain points in the composition, as the time taken to speak a given dialog varies from language to language. In certain implementations, the durations of full sentences are matched between languages. In another optional step, the second language audio dialog may be time-stretched while keeping pitch constant to improve its temporal match with the original language audio dialog (step 108). The language proxy may then be used by an editor familiar with the second language to edit the video composition (step 110). As mentioned above, this process generates a sequence of clips or segments, which are then relinked back to the underlying media of the original video and audio in the first language (step 112). The result is edited version 114 of the video composition rendered using the source media.

Figure 2:
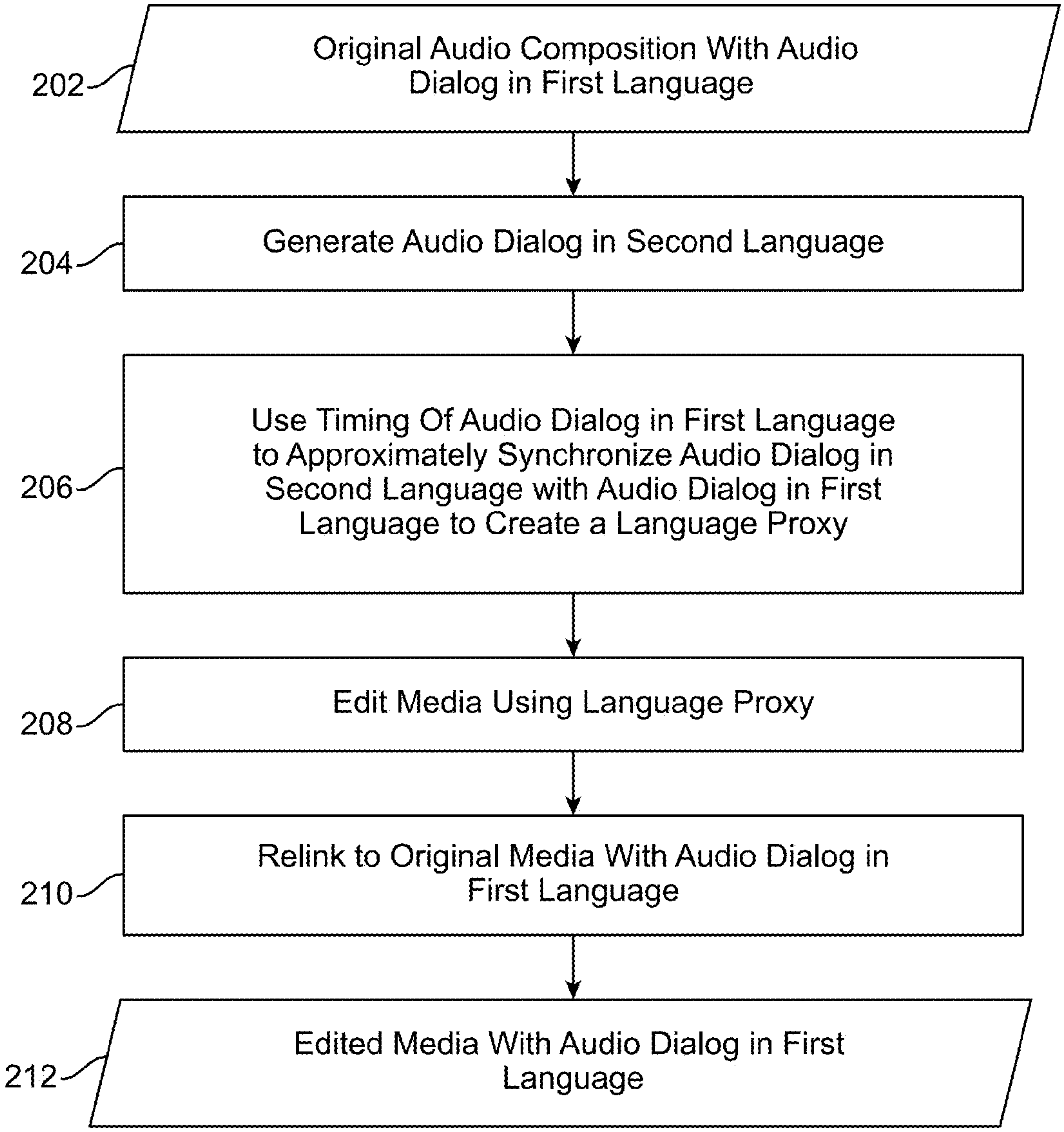
FIG. 2 is a high-level flow diagram illustrating the steps involved in editing an audio-only composition that includes spoken dialog.

FIG. 2 is a high-level flow diagram illustrating the steps involved in editing an audio-only composition that includes spoken dialog. Examples of such compositions include radio news programs, plays and podcasts. Original audio media 202 includes one or more audio tracks that contain spoken dialog in a first language. This is used as the source material for generating the audio dialog in a second language (step 204), as described below. The audio dialog in the second language is then approximately synchronized with the audio dialog in the original language using timing information associated with a transcript of the original dialog to create the language proxy (step 206). As in the case of the language proxy for a video composition described above, the synchronization may be approximate. In certain implementations, the durations of full sentences are matched between languages. More fine-grained synchronization includes the use of commas and other punctuation to make parts of longer sentences match in timing. Synchronization step 206 is useful when the overall length of the edited podcast is specified. The synchronization causes the edited length of the language proxy to reflect that of the edited version in the original language. The language proxy may then be used by an editor familiar with the second language to edit the audio composition (step 208). As mentioned above, this process generates a sequence of audio clips, which are then relinked back to the underlying media of the original video and audio in the first language (step 210). The result is edited version 212 of the audio composition with the dialog spoken in the original language.

Figure 3:
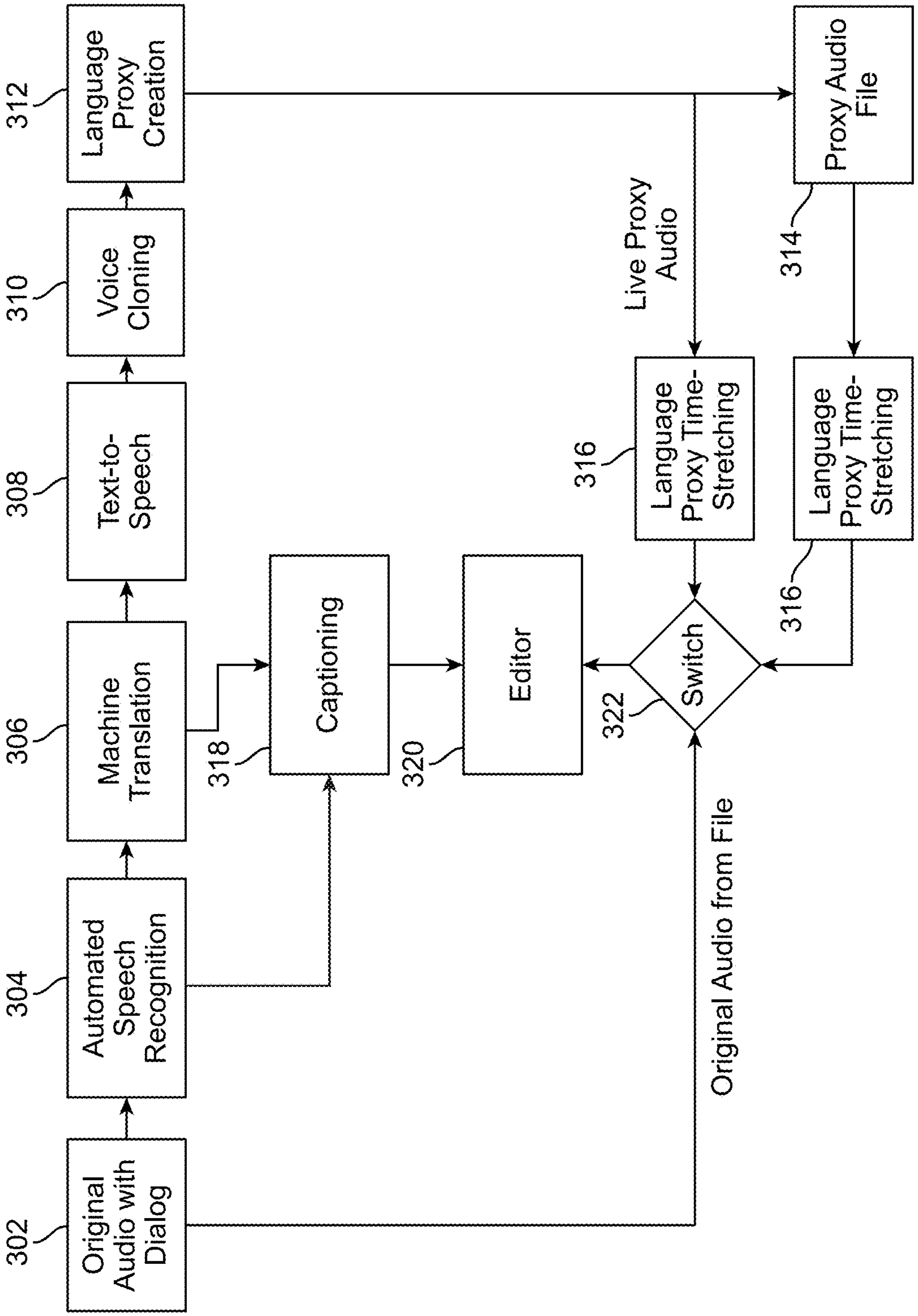
FIG. 3 is a simplified process flow diagram showing steps involved in generating a language proxy.

The principal steps involved in the described method of generating a language proxy are illustrated in FIG. 3. Original audio composition 302 contains spoken dialog in the original language. The audio may be a live stream or may be a file. The spoken dialog is received by automated speech recognition (ASR) module 304. ASR is used to generate transcripts and associated timing from input audio of human speech. The various steps involved in ASR include preprocessing of the original audio, the detection of voice activity within the audio, and the determination of the language spoken by the voice(s) detected. The speech is then converted into text using a machine-based speech-to-text (STT) process. Many methods have been used to convert speech to text. Increasingly, large language models that use machine learning (ML) and artificial intelligence (AI) are used for this process. ML/AI-based STT methods deploy a speech-to-text model that is typically trained on hundreds of thousands of hours of multilingual input. Certain models are able to support the conversion of speech to text in dozens of languages. At the heart of such solutions is the transformer, which is an AI building block that is trained to map input sequences, such as mel spectrograms, to output sequences such as word encodings. Transformers are described in "Attention is All You Need" by Vaswani, A., et al., *Advances in Neural Information Processing Systems, NIPS,* 2017, *arXiv:* 1706.03762, 2017. The transformer itself is based on an encoder/decoder architecture, such as that described in "Neural Machine Translation by Jointly Learning to Align and Translate," by Bahdnau, D., et al., *ICLR,* 2015, *arXiv:* 1409.0473, 2014. Examples of transformer-based TTS solutions include: Whisper™ from OpenAI, Inc., of San Francisco, California and described in Radford, E., et al., "Robust Speech Recognition via Large-Scale Weak Supervision," *International Conference on Machine Learning, PMLR,* 2023; Multilingual Machine Speech (MMS) from Meta, Inc., of Menlo Park, California, described in Pratap, V., et al., "Scaling speech technology to 1,000+ languages," *Journal of Machine Learning Research* 25.97, 2024, pp. 1-52; and Universal Speech Model (USM) from Google, Inc., of Mountain View, California, described in Zhang, Y., et al., "Google USM: Scaling automatic speech recognition Beyond 100 Languages," *arXiv:* 2303.01037, 2023. The publications cited above are wholly incorporated herein by reference.

The STT process outputs text corresponding to the spoken dialog in the audio file together with timing information. In various implementations, the timing for the start and end of each sentence or of each word is provided with the timing given in terms of time elapsed from the start of the detected speech. In cases where the output from the speech-to-text module is in the form of continuous text, the text is segmented into sentences, and diarized before final output from the speech-to-text module.

The output of ASR step 304 is provided to machine translation (MT) software module 306. MT converts text in a particular language to text in a different language, either through a rules-based approach or via neural networks. In various implementations, AI/ML-based MT methods are used, such as those described in Popel, M., et al., "Transforming Machine Translation: A Deep Learning System Reaches News Translation Quality Comparable to Human Professionals," *Nature Communications*, Vol. 11, No. 1, *Springer Nature,* 2020, which is wholly incorporated herein by reference. Again, the transformer architecture is the basis of modern ML-based MT solutions. Trained with a large number of examples, the transformer learns to map sequence patterns from the input to the output training data. Words are first represented numerically, in what is called an embedding. The embeddings are fed to an encoder, then to a decoder, and finally converted from numbers back to text in the destination language.

Given the large amount of available English training and test data in the ML field, many translation approaches first convert to English on their way to their final language. Other machine translation solutions do not use English as an intermediary language, an approach called multilingual machine translation (MMT) such as that described in Dabre, R., et al., "A Survey of Multilingual Neural Machine Translation," *ACM Computing Surveys*, Vol. 53, Issue 5, Art. No.: 99, 2020, pp. 1-38, which is wholly incorporated herein by reference.

The output of machine translation module 306 is provided to text-to-speech (TTS) module 308. TTS is the operation which produces intelligible speech from text, as measured by the speech's naturalness and intelligibility. The speech is output in the second language as desired by an editor of the media composition.

The history of TTS is rich and dates back to the 1930*s*. Many different TTS approaches have been implemented in the quest to mimic human speech, such as phoneme-based conversion from the text, vocal tract modelling as described in Rubin, P., et al., "An articulatory synthesizer for perceptual research," *Journal of the Acoustical Society of America*, Vol. 70, 1978, pp. 321-328, and formant synthesis, as described, for example, in Burk, P., et al., "Music and Computers: A Theoretical and Historical Approach", Chapter 4, Section 4.4, 2011. As with the ASR and MT, current methods of performing TTS are often based on neural networks.

The output from TTS module 308 may be provided to voice cloning module 310. This step may be bypassed, and the speech generated by TTS module 308 may be used for creating the language proxy. In this case, the voice is one of the voices offered by the TTS module and sounds like a different speaker from that in the original media. However, by using voice cloning, the translated dialog is made to resemble that of the original speaker. Voice cloning technology allows a person's voice to be replicated without requiring extensive recordings or physical presence, as described, for example, in Arik, S., et al., "Neural Voice Cloning with a Few Samples," *Advances in Neural Information Processing Systems, NeurIPS,* 2018. Voice cloning operates through voice generation models that analyze the acoustic features of the reference voice. These models, often based on deep learning algorithms, learn the nuances of speech patterns, tone, pitch, and emotional inflection. Once trained, the models can generate new speech that mirrors the reference voice, including its expressions, as described, for example, in Neekhara, P., et al., "Expressive Neural Voice Cloning," *arXiv:* 2102.00151, 2021.

The ability to capture the unique vocal attributes of an individual and reproduce them accurately is particularly valuable in media production for dubbing, voice-overs, and creating personalized audio content. In addition, voice cloning is able to streamline the post-production process by allowing editors and producers to generate dialogue or commentary in the voice of a chosen actor or presenter without requiring their direct involvement in every edit or retake. Voice cloning is beneficial for correcting minor errors in dialogue, extending existing recordings, or even translating content into multiple languages while maintaining the original speaker's vocal characteristics. As illustrated in FIG. 3, voice cloning step 310 receives speech output from TTS module 308 and generates speech output for language proxy 312 in the voice of the original spoken dialog 302. More specifically, the speech-to-speech conversion generates speech that sounds like the reference voice, but the words and timing are derived from a vocal performance as in the input source. An example of such a speech-to-speech cloning system is described in Luong, H. T. et al., "Nautilus: A Versatile Voice Cloning System," *arXiv:* 2005.11004, 2020, which is wholly incorporated herein by reference. In certain implementations, the voice cloning module converts text directly to the cloned voice, in which case TTS (308) and voice cloning (310) are effectively incorporated into voice cloning module 310, i.e., the two steps are combined.

In certain implementations, ASR/SST 304, MT 306, TTS 308, and voice cloning 310 are combined into a single new AI model to generate the same result. However, when these steps are merged, a transcription and its translation are not generated, and workflows involving the use of subtitles, as described below, are not available.

When an edited version of the media composition is edited and finished as a deliverable in the translated language, it may be more important for the dialog in the translated language to maintain its natural cadence, which might be compromised if the second language dialog was time-stretched to match the video. In such workflows, the video may be retimed to keep the video in sync with the translated dialog. Retiming the video may involve slowing down or speeding up portions of the video.

The translated language speech, whether in a standard voice supplied by a TTS system or in the cloned voice of the original audio is used to create the language proxy 312. When the audio comprises dialog for a video composition, the translated audio is combined with the original video, which may be achieved by relinking the master clip to different, translated and optionally voice-cloned audio. Synchronization between the video and translated audio is performed using the timing information from the MT text output. The language proxy may be stored as proxy audio file 314 locally to the editor and the editing application being used or remotely, on a remote server or in the cloud.

In various use cases, the language proxy is not stored as a proxy audio file but is retained in memory where it can be provided to the editor, either on its own for audio-only compositions, or, for a video composition, in combination with the video of the original composition.

Since the time taken to speak a given text varies from voice to voice and also from language to language, the translated voice, whether cloned or not, may no longer correctly sync up the corresponding video picture, or, for an audio-only composition, the duration requirements may no longer be met. To correct this, audio time-stretching 316 may be used, in which the underlying audio duration is modified while retaining the original pitch. Audio time stretching may be performed using a plug-in software module with a digital audio workstation such as Pro Tools®, a product of Avid Technology, Inc., of Burlington, Massachusetts. Examples of such plug-in modules include Time Shift™, a product of Avid Technology, Inc., and Pitch 'n Time Pro™, a product of Serato of Auckland, New Zealand.

The methods described herein may also be used for captioning/subtitling during the editing workflow. Captioning can either be open, where the text is burned into the media, or closed, where the data representing the text is embedded in the digital video stream and optionally overlayed on the video in the monitor device, such as a television or computer display. The use of captioning with translations is referred to as subtitling. In the workflow illustrated in FIG. 1, the text generated by MT module 306 is used to supply the captioning text 318 in the translated language. Subtitling can be an effective way to comprehend media during the editing process. However, since the captions are composited over video, it can distract from the video content, as editor 320 must constantly be reading rather than focusing on the visual content.

When a language proxy is available, an editor who wishes to edit in the translated language may use switch 322 to select the language proxy, either from proxy audio file 314 or live from memory.

Video editing applications, such as Media Composer®, a product of Avid Technology, Inc. of Burlington, Massachusetts, provide the ability to relink media, often between a high resolution and a lower resolution or more highly compressed replica of the original. This is done to save disk space and bandwidth while composing a sequence. During the editing process, the proxy is an effective stand-in for the original. For finishing, the clips in the sequence are relinked back to the original high-resolution source and a high-quality finished result is generated. In a similar vein, proxy clips may be created with alternate audio tracks in which dialog is spoken in languages that differ from that spoken in the original.

The resulting translated proxy audio is used as a stand-in for the original audio. Editing can now occur using the language proxy without the need for subtitles. For example, a clip which has dialogue in Japanese can be edited by a native French speaker who is not familiar with Japanese by listening to a language proxy in which the dialogue is in their native French. When editing is complete, the editor relinks back to the original media to finalize the program in the original Japanese for the finishing touches and review. In the case where a real-time modification of the original is used for the proxy, the original audio is processed to create a translated voice clone as needed. For the final review in the original language, the real-time modifications to the audio can be bypassed to hear the original language.

The methods described herein facilitate multilingual searches of media. Once the translated language transcripts for a clip or group of clips are available and stored in a database, it is possible to efficiently search for a given word or phrase across all indexed clips. This helps overcome the limitations of searching for specific material in transcripts of source media that originated from unfamiliar languages. By associating the original transcript of the dialogue with its translation, the editor can search in both the original and the translated transcripts and be taken directly to the approximate timing offset in the original media.

An alternate approach to multilingual search is based on a semantic search of the original material and the search phase. With semantic search, the underlying meaning of the word or phrase is used as the search criterion, rather than a match based on the words and spelling of a search query. The words for both the transcript and the search phrase are transformed into embeddings, which are numerical representations of the words stored as vectors. Through the cosine similarity or similar vector-based comparison operation, search can produce a ranked list of close matches. In this case, the underlying languages do not need to match, as the embedding step is able to encode the original languages used for the dialogue and for search into a common embedding space. An example of such semantic search is provided by Search™, a product of Twelve Labs of San Francisco, California.

Figure 4:
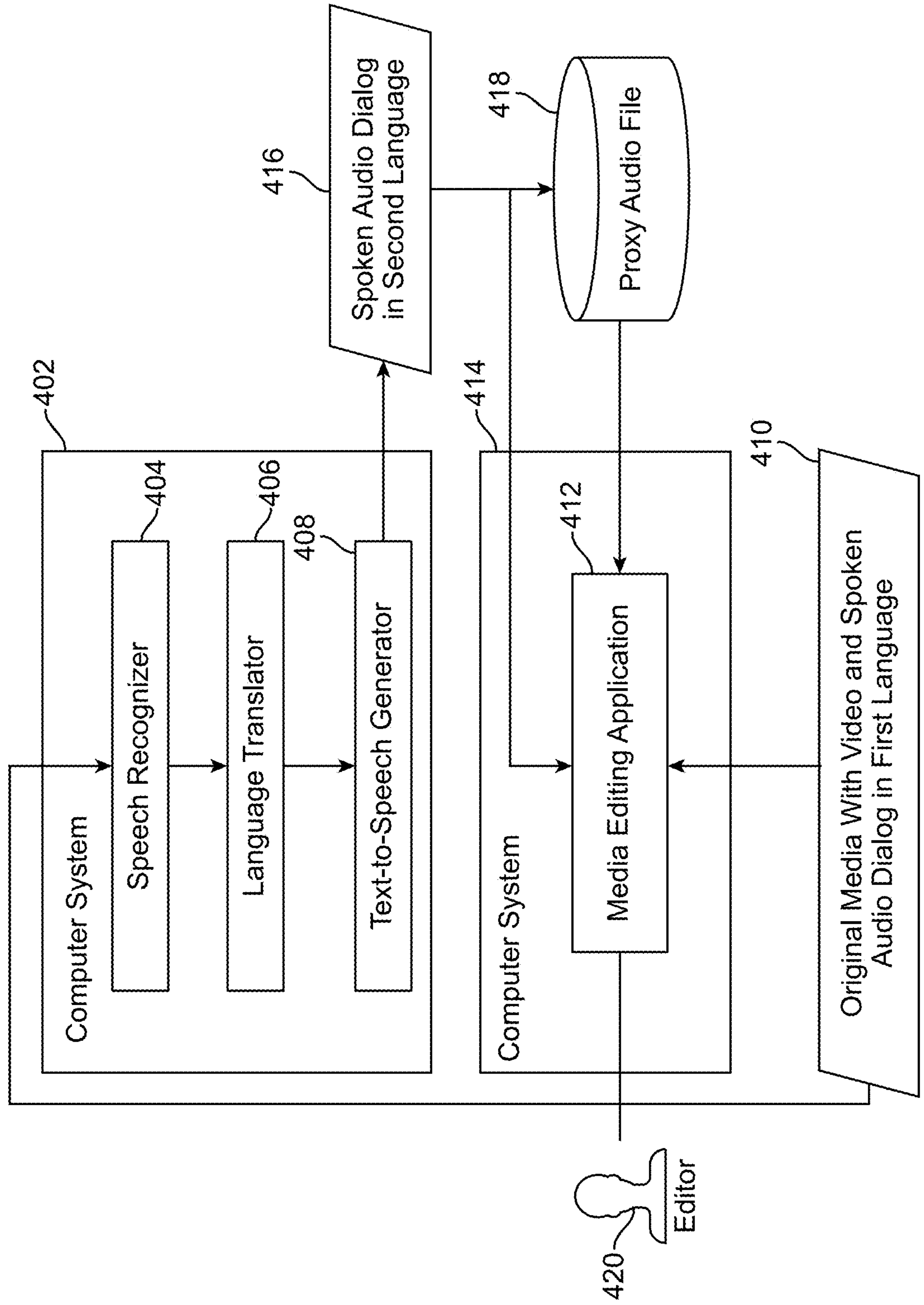
FIG. 4 is a high-level block diagram of a system for editing a media composition containing spoken dialog by using a language proxy.

FIG. 4 is a high-level block diagram of a system for editing a media composition using a language proxy. Computer system 402 hosts speech recognizer software 404, language translation software 406, and text-to-speech software 408. In various implementations, some or all of the functions performed by software modules 404, 406, and 408 are at least partially performed by special purpose firmware or hardware. The functions of the three software modules may be combined in various ways, for example in an AI/ML system with a model that is able to input audio containing dialog in a first language and output the corresponding translated speech in a second language. Media composition with audio in a first language 410 is provided to media editing application 412 hosted by computer system 414. The media composition is also retrieved by computer system 402, where it is input and processed by the speech recognizer, language translator, and text-to-speech generator. Text-to-speech generator 408 outputs second language spoken audio dialog 416, which may be accessed in real-time for editing of the media composition using the language proxy or may be stored on storage 418. Editor 420, using media editing application 412 hosted by computer system 414, is able to edit the media composition using the language proxy. In various implementations, the functions performed by computer systems 402 and 414 are hosted by a single system, which may be local to the editor or implemented as remote servers or in the cloud.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or non-writeable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of editing media, the method comprising:
- receiving a media composition that includes dialog in a first language spoken by a first voice;
- converting the spoken dialog in the first language to first language text using automatic speech recognition;
- using machine-learning-based text-to-text translation to translate the first language text into second language text;
- using text-to-speech synthesis on the second language text to generate a spoken dialog in the second language;
- generating a language proxy by linking the spoken dialog in the second language to the media composition, such that the spoken dialog in the second language is in temporal synchrony with video of the media composition;
- enabling an editor to edit the media composition by editing the language proxy;
- relinking a version of the media composition that has been edited using the language proxy to source media of the media composition, wherein the source media includes the spoken dialog in the first language; and
- generating an edited version of the media composition with dialog spoken in the first language.

2. The method of claim 1, wherein the text-to-speech synthesis on the second language text uses machine-learning-based voice cloning to generate dialog in the second language spoken by a voice that resembles the first voice.

3. The method of claim 1, wherein the spoken dialog in the second language is temporally synchronized by matching a plurality of sentence durations in spoken dialog in the second language to corresponding sentence durations in the dialog spoken in the first language.

4. The method of claim 1, wherein the media composition includes video that is synchronized with the spoken dialog in the first language.

5. The method of claim 4, wherein the spoken dialog in the second language is time-stretched to improve synchronization of the spoken dialog in the second language with the video.

6. The method of claim 4, wherein the video is retimed to synchronize with the spoken dialog in the second language and the media composition is finished with spoken dialog in the second language.

7. The method of claim 1, wherein the spoken dialog in the second language is stored as a file and the language proxy retrieves audio from the file.

8. The method of claim 1, wherein the spoken dialog in the second language is generated in real-time when required by an editor who is editing the media composition with dialog in the second language.

9. The method of claim 1, further comprising compositing over the video of the media composition a text translation in the second language of the spoken dialog in the first language.

10. The method of claim 1, further comprising compositing over the video of the media composition text of the spoken dialog in the first language.

11. A computer program product comprising:
- a non-transitory computer-readable medium with computer-readable instructions encoded thereon, wherein the computer-readable instructions, when processed by a processing device instruct the processing device to perform a method of editing media, the method comprising:
  - receiving a media composition that includes video and audio, wherein the audio includes dialog in a first language spoken by a first voice;
  - converting the spoken dialog in the first language to first language text using automatic speech recognition;
  - using machine-learning-based text-to-text translation to translate the first language text into second language text;
  - using text-to-speech synthesis on the second language text to generate a spoken dialog in the second language;
  - generating a language proxy by linking the spoken dialog in the second language to the media composition, such that the spoken dialog in the second language is in temporal synchrony with the video of the media composition;

enabling an editor to edit the audio and video of the media composition by editing the language proxy;

relinking a version of the media composition that has been edited using the language proxy to source media of the media composition, wherein the source media includes the spoken dialog in the first language; and generating an edited version of the media composition with dialog spoken in the first language.

12. A system comprising:

a memory for storing computer-readable instructions; and a processor connected to the memory, wherein the processor, when executing the computer-readable instructions, causes the system to perform a method of editing media, the method comprising:

receiving a media composition that includes video and audio, wherein the audio includes dialog in a first language spoken by a first voice;

converting the spoken dialog in the first language to first language text using automatic speech recognition;

using machine-learning-based text-to-text translation to translate the first language text into second language text;

using text-to-speech synthesis on the second language text to generate a spoken dialog in the second language;

generating a language proxy by linking the spoken dialog in the second language to the media composition, such that the spoken dialog in the second language is in temporal synchrony with the video of the media composition;

enabling an editor to edit the audio and video of the media composition by editing the language proxy;

relinking a version of the media composition that has been edited using the language proxy to source media of the media composition, wherein the source media includes the spoken dialog in the first language; and generating an edited version of the media composition with dialog spoken in the first language.

* * * * *